No. 670,579. Patented Mar. 26, 1901.
A. A. COMMON.
APPARATUS FOR SIGHTING ORDNANCE.
(Application filed Mar. 6, 1900.)
(No Model.) 2 Sheets—Sheet 1.
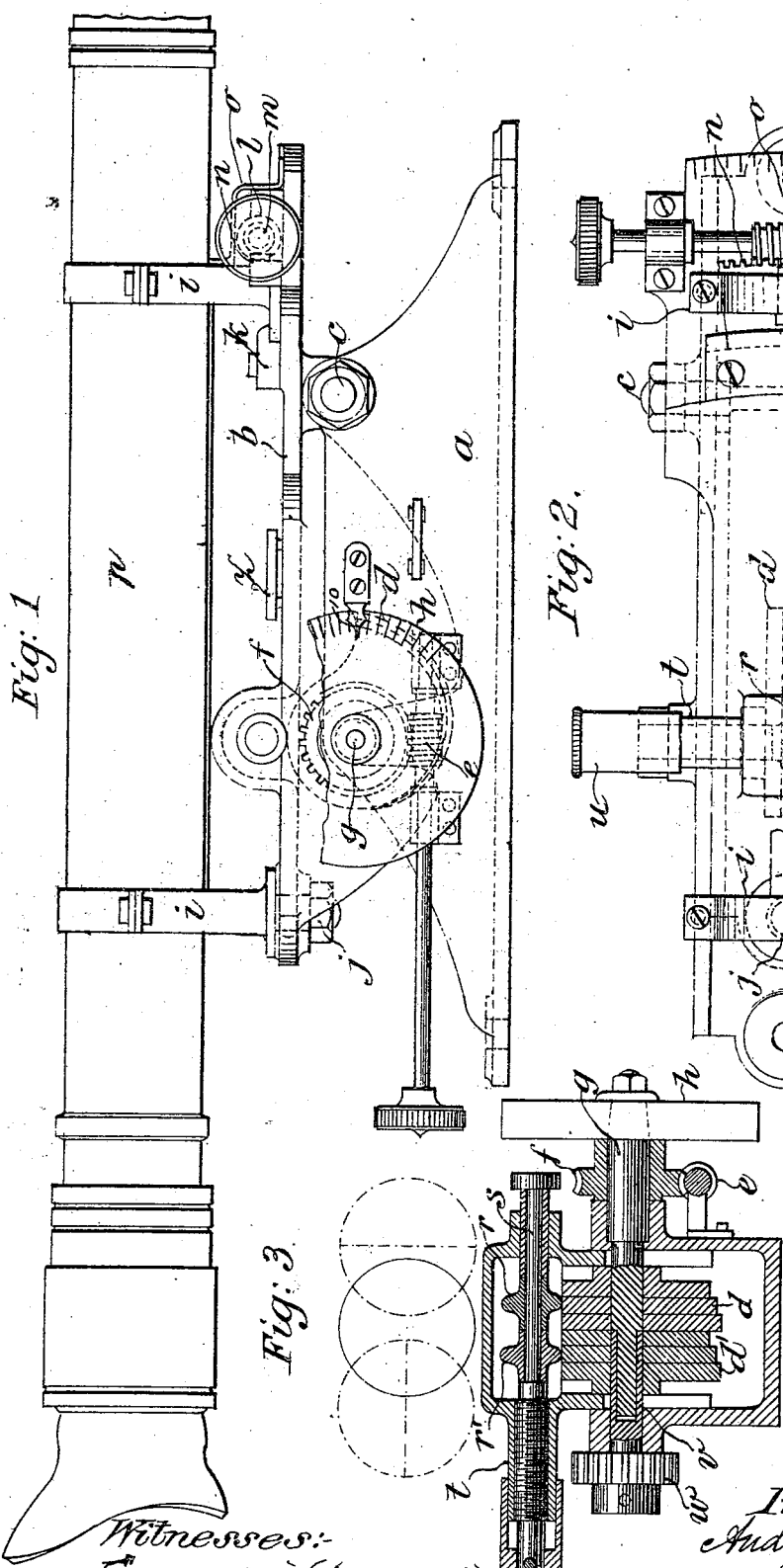

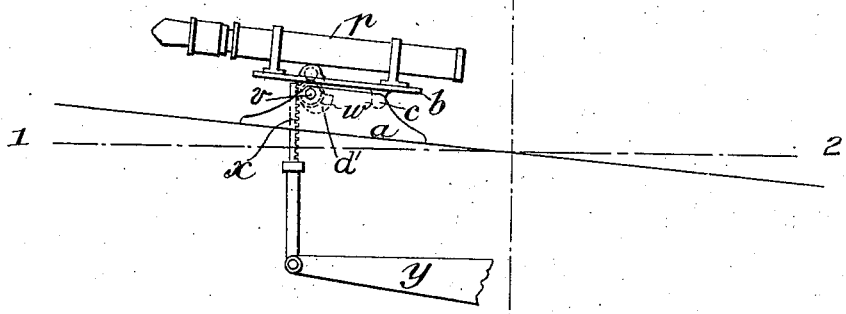
Fig: 4.
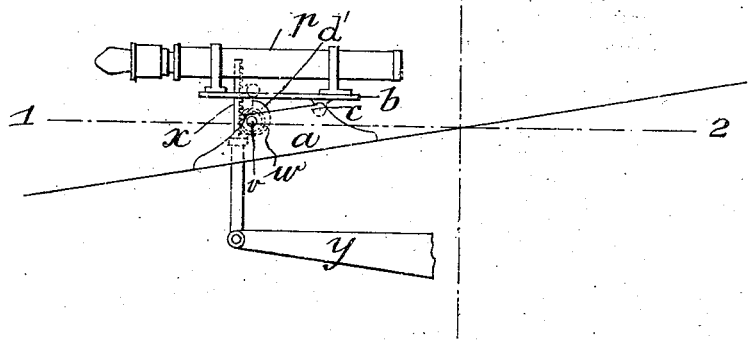
Fig: 5.

UNITED STATES PATENT OFFICE.

ANDREW AINSLIE COMMON, OF EALING, ENGLAND.

APPARATUS FOR SIGHTING ORDNANCE.

SPECIFICATION forming part of Letters Patent No. 670,579, dated March 26, 1901.

Application filed March 6, 1900. Serial No. 7,458. (No model.)

*To all whom it may concern:*

Be it known that I, ANDREW AINSLIE COMMON, gentleman, of 63 Eaton Rise, Ealing, in the county of Middlesex, England, have invented certain new and useful Improvements in Apparatus for Sighting Ordnance, of which the following is a specification.

In the accompanying drawings, Figure 1 is a side view, and Fig. 2 is a plan view with the telescope removed, of the apparatus for sighting ordnance and showing a single multiple cam. Fig. 3 is a cross-section, taken on the axis of the cam-shaft, showing two sets of multiple cams; and Figs. 4 and 5 are diagrams showing an automatic adjustment for the telescope, which will be described more especially with reference to Fig. 3.

Referring now to Figs. 1 and 2, A is a base-plate to be attached to the gun or gun-slide. This plate $a$ carries a plate $b$, hinged at $c$ to obtain the necessary motion in altitude under the action of multiple cams $d$ $d'$. The cam $d$ is operated by a worm $e$, working the worm-wheel $f$, secured to the shaft $g$, to which the cam $d$ is also attached, said shaft being mounted in bearings on the plate $a$. A suitable scale (see Fig. 1) on the face of a wheel $h$ on the cam-shaft $g$ and an index 10, attached to the plate $b$, serve to indicate the amount of movement to be given.

On the hinged plate $b$ are mounted straps $i$, suitably connected together and constituting a telescope-carrier, as shown. One of these straps is secured at $j$ by a pin-joint and the other by a clamping-piece $k$ to the plate $b$.

The telescope-carrier is free to turn on the pin-joint $j$ under the action of a worm $l$ on the rod $m$, acting on the forward strap $i$, which is provided with a toothed sector $n$, which works in the clamping-piece $k$. Thus the necessary side motion can be given to the telescope and read off from a scale (see Fig. 2) on the front edge of the hinged plate $b$, on which the carrier moves, by means of the pointer $o$, attached to the telescope-carrier.

$p$ is the telescope, (not shown in Fig. 2,) which may be a single, of the ordinary construction, but may, if desired, be a binocular or twin telescopes, as indicated in dotted lines, Fig. 3, with a vertical cross-wire in one tube or telescope and a horizontal cross-wire in the other.

The multiple cam $d$, which is composed of several cam-surfaces, works against a roller or rollers $r$, which are mounted on the axle $s$, a portion of which is threaded, as shown, and takes into a threaded bearing $t$ for the axle $s$. At one end this axle is connected to a milled cap $u$, which slides over the end of the bearing $t$. The roller may thus receive lateral motion and can be brought to work against either of the cam-surfaces by turning the cap $u$ of the screw $s$, which thus moves the rollers $r$ to any desired position. Its exact position is shown by marks on the bearing $t$, in which the screw works, the cap $u$ covering or exposing these marks as the screw is worked in or out.

In place of a multiple cam composed of several cams, as shown, one cam with a smooth face, as if made of an infinite number of cams slightly differing, may be used, so that any desired amount of elevation differing slightly from the normal may be given by the same angular motion of the cam, and thus a slight change in the value of the explosive, or, in the case of an automatic arrangement, the rise and fall of the tide (when this would affect the position of the object aimed at) may be corrected or allowed for.

For the purpose of using this apparatus as an automatic sighting apparatus when the gun is used for an elevation and is of that type called "quick-firing" (when the gun recoils in a slide supported on trunnions mounted so as to turn around a fixed vertical post) the duplicate cam arrangement $d'$ is employed. The additional cam $d'$, which is substantially like $d$, I mount on a sleeve $v$, which takes into the cam-shaft $g$, which sleeve $v$ works independently of the spindle $g$, which is operated by hand by the worm-wheel $f$. On this sleeve $v$ I mount a pinion $w$, which engages with a toothed rack $x$. (See the diagrams, Figs. 4 and 5.) This rack is attached to an arm $y$, projecting from that part of the gun-mounting which moves only in azimuth, the apparatus being attached to the carriage in which the gun slides, which has a motion in altitude only. The effect of this arrangement is shown in Fig. 4, where 1·2 is a horizontal line and the direction of the gun and telescope is the same, (point-blank range,) and on Fig. 5, where in order to get the telescope to point to an object on the horizon, supposing this to be within the range of the gun, the movement ... altitude of the gun to get this range brings the telescope on the object.

The relation of the length of arm and rack to the size of pinion and shape of cam can be made such as to suit any size of gun-mounting or any elevation of situation of the gun.

$z$ is a spirit-level on the plate $b$, and a similar spirit-level may also be provided on the side of the base $a$, as shown in Figs. 1 and 2.

The trajectories having been determined for the ammunition to be used it is easy to determine if the cam or cams have the proper value, agreeing with the scale on the disk of the sighting apparatus. Similarly, it is easy to test the value of the automatic sighting arrangement for any determined height and the value of the movement of the wheel acting on the sloping-faced cam for slight corrections, the horizontal scale checking the value of the azimuth movement.

I claim—

In means for carrying and adjusting sighting-telescopes for ordnance whereby movements in altitude and azimuth are obtained, the combination of a base adapted to be fixed to the gun or the gun-slide on which the gun recoils and provided with a shaft carrying multiple cams mounted transversely of the base together with means for adjusting the cams consisting of a worm and worm-wheel to effect the movement in altitude, a telescope-carrier pivoted to the base on one side of the cam-shaft provided with transversely laterally movable supporting devices bearing on said cams and means for adjusting the supporting devices transversely to said cams, the carrier also having a pivoted element and a sliding element to give a movement in azimuth and means consisting of a worm and segment-rack for operating said sliding element in azimuth, all combined, arranged and operating as herein shown and described.

ANDREW AINSLIE COMMON.

Witnesses:
H. K. WHITE,
W. M. HARRIS.